US010196005B2

(12) United States Patent
Eytan et al.

(10) Patent No.: US 10,196,005 B2
(45) Date of Patent: Feb. 5, 2019

(54) METHOD AND SYSTEM OF CAMERA FOCUS FOR ADVANCED DRIVER ASSISTANCE SYSTEM (ADAS)

(71) Applicant: Mobileye Vision Technologies Ltd., Jerusalem (IL)

(72) Inventors: Ori Eytan, Jerusalem (IL); Avi Eyal, Jerusalem (IL); Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 143 days.

(21) Appl. No.: 15/001,880

(22) Filed: Jan. 20, 2016

(65) Prior Publication Data

US 2016/0214546 A1    Jul. 28, 2016

Related U.S. Application Data

(60) Provisional application No. 62/106,328, filed on Jan. 22, 2015.

(51) Int. Cl.
| | |
|---|---|
| *B60R 11/04* | (2006.01) |
| *H04N 5/232* | (2006.01) |
| *H04N 5/225* | (2006.01) |
| *H04N 17/00* | (2006.01) |

(52) U.S. Cl.
CPC ........... *B60R 11/04* (2013.01); *H04N 5/2253* (2013.01); *H04N 5/2254* (2013.01); *H04N 5/23212* (2013.01); *H04N 17/002* (2013.01)

(58) Field of Classification Search
CPC .... B60R 11/04; H04N 5/2253; H04N 5/2254; H04N 5/23212; H04N 17/002

USPC ......................................................... 348/148
See application file for complete search history.

(56) References Cited

U.S. PATENT DOCUMENTS

| | | | | |
|---|---|---|---|---|
| 6,774,945 | B1 * | 8/2004 | Bohn ....................... | G02B 7/28 348/345 |
| 8,619,144 | B1 * | 12/2013 | Chang ....................... | G06T 7/80 348/180 |
| 2007/0065014 | A1 * | 3/2007 | Owechko ................. | G06K 9/42 382/190 |

(Continued)

FOREIGN PATENT DOCUMENTS

| | | |
|---|---|---|
| DE | 10 2013 102 819 | 9/2014 |
| WO | 2016/116934 A1 | 7/2016 |

OTHER PUBLICATIONS

International Search Report and Written Opinion, dated May 6, 2016, directed towards International Application No. PCT/IL2016/050067; 8 pages.

(Continued)

*Primary Examiner* — Marnie A Matt
(74) *Attorney, Agent, or Firm* — Schwegman Lundberg & Woessner, P.A.

(57) ABSTRACT

A camera and production technique for an ADAS. The camera lens and image sensor are positioned along multiple axes using a target located at a first distance from the lens to establish a first relative position between the lens and the image sensor. The first relative position between the lens and the image sensor is modified by a predetermined amount for an object located a second distance from the lens. The second distance is larger than the first distance.

16 Claims, 1 Drawing Sheet

An example of DegreesOf Freedom (DOF) or Axes, of IS alignment relative to camera lens
1. X, Lateral movement in parallel to IS Rows
2. Y, Lateral movement in parallel to IS columns
3. Z, Lateral movement in perpendicular to IS plane
4. θx, Rotation about x axes
5. θy, Rotation about y axes

(56) References Cited

U.S. PATENT DOCUMENTS

| | | | | |
|---|---|---|---|---|
| 2007/0160370 | A1* | 7/2007 | Kikuchi | G02B 13/0015 396/529 |
| 2008/0273111 | A1* | 11/2008 | Gustavsson | G02B 13/0015 348/340 |
| 2008/0316350 | A1* | 12/2008 | Gottwald | H01L 27/14618 348/340 |
| 2009/0279075 | A1* | 11/2009 | Tsai | G01M 11/0214 356/124 |
| 2010/0045700 | A1* | 2/2010 | Lefevre | G02B 23/00 345/633 |
| 2010/0103308 | A1* | 4/2010 | Butterfield | H01L 27/14685 348/340 |
| 2012/0181419 | A1* | 7/2012 | Momtahan | G06F 3/0421 250/221 |
| 2012/0287240 | A1* | 11/2012 | Grossmann | G06T 7/0018 348/46 |
| 2013/0002861 | A1* | 1/2013 | Mitsugi | G01C 3/00 348/135 |
| 2013/0010119 | A1* | 1/2013 | Mitsugi | B60R 1/00 348/148 |
| 2014/0104425 | A1* | 4/2014 | Kiyono | B60R 16/02 348/148 |
| 2014/0267764 | A1* | 9/2014 | Southerland | H04N 5/33 348/164 |
| 2015/0254818 | A1* | 9/2015 | Li | G06T 5/006 382/275 |
| 2016/0014313 | A1* | 1/2016 | Muller | H04N 5/2253 348/294 |
| 2016/0189361 | A1* | 6/2016 | Lo | H04N 13/0271 382/106 |
| 2016/0210750 | A1* | 7/2016 | Singh | G06T 7/80 |

OTHER PUBLICATIONS

Brown, Duane C. "Close-Range Camera Calibration," *Symposium on Close-Range Photogrammetry*, Jan. 1971, Urbana, Illinois; pp. 855-866.
Wang, Aiqi et al. (2009). "A Simple Method of Radial Distortion Correction with Centre of Distortion Estimation," J Math Imaging Vis 35: pp. 165-172.
Stein, Gideon P. (1997). "Lens Distortion Calibration Using Point Correspondences," IEEE 1063-6919/97: 602-608.
Stein, Gideon P. (1996). "Lens Distortion Calibration Using Point Correspondences," Massachusetts Institute of Technology: 9 pages.
International Preliminary Report on Patentability received for PCT Application No. PCT/IL2016/050067, dated Aug. 3, 2017, 7 pages.
"European Application Serial No. 16712089.8, Communication Pursuant to Article 94(3) EPC dated Aug. 7, 2018", 5 pgs.

* cited by examiner

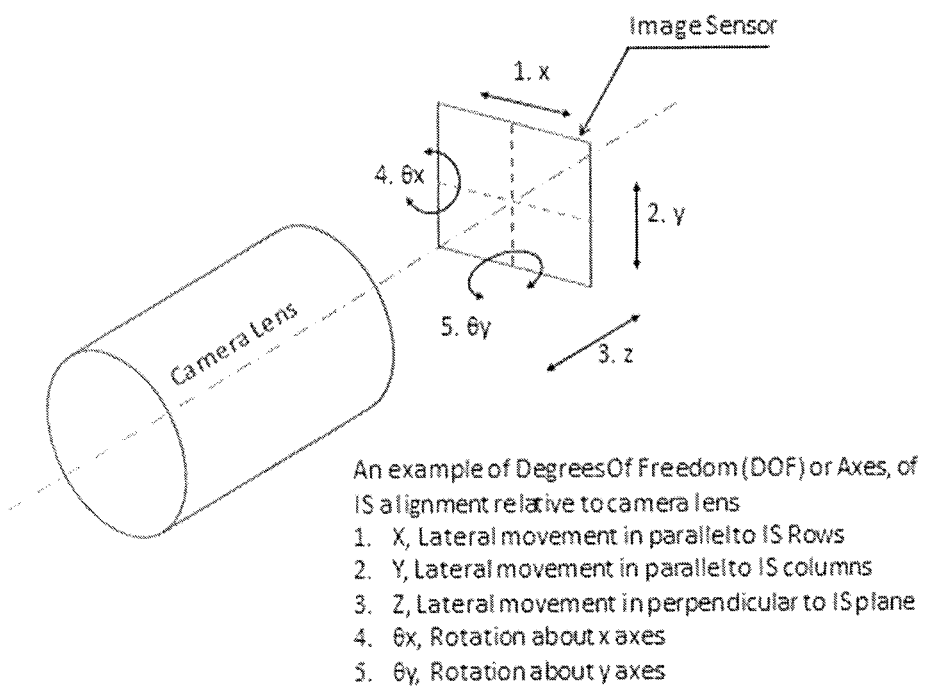

METHOD AND SYSTEM OF CAMERA FOCUS FOR ADVANCED DRIVER ASSISTANCE SYSTEM (ADAS)

CROSS-REFERENCE TO RELATED APPLICATION

This application claims the benefit of U.S. Provisional Application No. 62/106,328, filed Jan. 22, 2015, the entire content of which is incorporated herein by reference.

BACKGROUND

Camera-based Advanced Driver Assistance Systems (ADAS) are well known, widely used mass produced machine vision systems useful for a variety of applications. Such applications may include, for example, lane departure warning, lane keeping, vehicle detection, forward collision and adaptive cruise control, and other known driver assistance applications. With advances in ADAS applications, greater demands are being placed on the modeling of radial distortion of lenses used in ADAS.

The importance of modeling lens distortion in photometry is described in Brown 1971, in which a distortion model is described (see Duane C. Brown, *Close Range Camera Calibration*, Photogrametric Engineering 1971). Various known methods exist for determining the radial distortion parameters of a camera after production. For example, Wang et. al. 2009 describe an efficient post-production method for calibrating the lens distortion parameters including the center of radial distortion (see Aiqi Wang, Tainshiang Qiu and Longtan Shao, *A Simple Method of Radial Distortion Correction with Center of Distortion Estimation*, J. Math. Imaging Vis. 2009). They use images of straight lines, and thus require a separate calibration step for each camera after production. The method of Stein (CVPR 1997) can be used to calibrate the lens distortion online using point correspondences, but this method requires non-linear optimization over four parameters (including K1, K2 and center of radial distortion) which may lead to stability problems (see Gideon P. Stein, *Lens Distortion Calibration Using Point Correspondences*, In Proc. CVPR 1997).

To some extent nominal lens values may be used for modeling distortion, but this may lead to inaccurate measurements since the center of radial distortion can vary considerably. One known alternative is to design lenses with minimal distortion so the lenses can be accurately modeled using the pinhole camera model. However, minimizing distortion in such designs often comes at the expense of the lens MTF, F#, size and lens price, and may lead to suboptimal performance.

Camera systems having a mechanical or electronic focus may reduce or eliminate the need for accurate focusing during manufacture. However, mechanical focus is not common in ADAS systems, where high reliability and long hours of use make mechanical systems impractical. Digital focus techniques, such as those used in some smartphone cameras, typically require high resolution and small pixel size and often fail to provide the light sensitivity desirable for ADAS. Thus, especially for cameras in ADAS, there is frequently a need for some form of lens focusing during manufacture.

It is further known that, in most cases, the camera is typically focused at infinity. However, in practice, it is generally not possible to position a focus target far enough away to give an ideal focus at infinity. A typical solution is to use a collimator lens with a target placed at a focal length corresponding to the focal length of the collimator lens. This known method generally requires a very high quality collimator lens to fill the wide FOV. This known method also generally requires precise positioning of both the target and the camera relative to the collimator. Furthermore, the lens distortion of the collimator may be compounded with the lens distortion of the camera lens, thus making it difficult to estimate the parameters for the camera lens alone.

SUMMARY OF THE DISCLOSURE

Disclosed herein are methods and systems for camera production in which the lens focus procedure can set the location of the center of radial distortion to a fixed location that may be common to all manufactured cameras of this type. The technique is well-suited for production of ADAS cameras. In accordance with one embodiment disclosed herein, a camera may be manufactured such that the center of radial distortion is at a set point in the image, and preferably at the center of the image. Once the center of radial distortion is known, the nominal values for K1 and K2 may provide good estimates of the true radial distortion. If more accuracy is desired, several known methods can also be used (including those disclosed in Stein 1997), but with fewer unknown parameters the solution may tend to be more stable.

In a multi-camera system, if at least one of the cameras has been well calibrated for lens distortion in accordance with the present disclosure then the other lenses may be calibrated online in a straightforward and stable manner.

In many high-end ADAS multi-camera systems there is a main camera with horizontal field of view (HFOV) between 40 and 70 degrees. This camera can support many single camera ADAS functions and is often of shared specifications with monocular ADAS systems. The other cameras may be of significantly wider or narrower FOV. It is possible to manufacture the main camera with known center of radial distortion and manufacture the other camera or cameras with less strict manufacturing tolerances.

The proposed solution positions a focus and calibration target at a finite distance from the lens, such as 0.5 m. The camera is focused to that distance by adjusting the position of the lens in five degrees of freedom (three degrees of translation and two degrees of rotation, the lens is rotationally invariant). After optimal focus is achieved, the lens is shifted by a fixed distance to give optimal focus at infinity. Since there is no collimator lens the distortion of the focus at the calibration target is due to the camera lens only. This process will be described in more detail in the following section.

BRIEF DESCRIPTION OF THE DRAWINGS

FIG. 1 shows one example of the relative position of a camera lens and an image sensor in one embodiment.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples. Furthermore, while example contexts in which the disclosure can be practiced are provided, they are not meant to limit the scope of the disclosure to those contexts.

Camera manufacturing generally involves the production of an assembly that includes a lens and an image sensor. Production of good quality images by the camera typically depends on the lens and the image sensor being optimally positioned relative to each other. The term "align" is often used to describe optimizing the relative position between the camera lens and the image sensor.

Cameras may be aligned by active control of the relative position of the lens and the image sensor. The alignment process may use motorized actuators that change the relative position of the lens and the image sensor, including automatically deciding when a desired relative position is achieved.

With reference to the example shown in FIG. 1, the relative movement between the lens and the image sensor in this example may be described in terms of orthogonal axes x, y, z, where:

x represents an axis parallel to the image sensor pixel rows;

y represents an axis parallel to the image sensor pixel columns;

z represents an axis perpendicular to the image sensor plane;

θx represents rotation about the x axis;

θy represents rotation about the y axis;

In one embodiment computer controlled positioning motors may be used to position the image sensor (and, optionally, a camera housing) relative to a camera lens that is in a fixed position. In an alternative embodiment a lens may be moved relative to an image sensor (and, optionally, a camera housing) that is fixed in position. In one embodiment the focus and calibration target may include a checkerboard pattern having lines that are not straight but that are designed to appear almost straight in the image.

Multiple Axis Alignment to Far Distances without Intermediary Optics

In one example, the camera lens may be initially aligned along multiple axes using a focus and calibration target positioned at a first, relatively short, distance from the lens (for example, the first distance may be on the order of about 0.85 m). The lens orientation along the θx and θy axes and the distance between the lens and the image sensor along the z axis may be adjusted to achieve optimal focus over the entire field of view. The center of radial distortion may be detected and the lens and image sensor may be aligned so that the center of radial distortion coincides with a specified point. In a preferred embodiment the specified point coincides with the center of the image sensor.

Next, in order to change the alignment to one that is optimal for objects at a second, farther distance, the relative position of the camera lens and the image sensor along the z axis may be modified by a predetermined amount. In one example, the predetermined amount may depend on (1) the lens being focused, (2) the near target distance and (3) the desired distance of the optimal object plain. For example, in an embodiment using a Sunny 4067 lens having an Effective Focal Length (EFL) of 5.47 mm, the modification along the z axis is 35 um.

Once the lens and image sensor are aligned the lens may optionally be fixed in position relative to the camera holder by any number of known methods. For example, the lens may be glued in place into the holder.

In one embodiment the focus and calibration target may preferably cover the whole image, so that optimal focus can be determined for the whole field of view. In one embodiment the focus and calibration target may be a checkerboard pattern that has been warped to match the radial distortion of the lens. In this embodiment the focus and calibration target lines are curved so that they appear almost straight in the image. This technique may simplify the task of finding a grid pattern in the image. Furthermore, it may enable more accurate localization of the corners of the squares in the image, since the corners are almost right angles. MTF calculating algorithms such as sfrmat2 generally require slanted lines, so the focus and calibration target in accordance with this embodiment has a small rotation and the edges are neither exactly horizontal nor vertical. Since the checkerboard lines are almost straight, this angle is almost uniform over the image, improving the reliability and uniformity of sfrmat2.

A fiducial point may be used, for example in the form of a white dot on one of the squares, to help correctly identify points in the image to corresponding points in the focus of a calibration target. The center of radial distortion can then be determined from the corresponding target and image coordinates. The mapping from target plane to image may be characterized as a homography. Deviations from the homography are due to the radial distortion, and a closed form solution for the center of radial distortion is known in the art.

In the above-described embodiment the lens and the image sensor may be initially aligned using a target positioned at a first, relatively short distance from the lens. Then the relative spacing between the lens and the image sensor may be changed by a predetermined amount. This technique can help to eliminate the need for intermediate optics (such as a collimator) that would otherwise be positioned between the camera lens and the target in order to image a near target to far distance for allowing camera focus to a far distance. Intermediate optics may introduce aberrations into the feedback mechanism and make it difficult to determine the center of radial distortion. Intermediate optics may also require high positional accuracy relative to the target, the image sensor and the lens. The embodiments disclosed herein help to eliminate the disadvantages associated with the use of intermediary optics.

In the above-described embodiment the lens and image sensor may be aligned so that the center of radial distortion coincides with the center of the image sensor. This technique may save the requirement for position accuracy in x and y of the target relative to the camera being focused, because the x and y feedback is directly related to the lens, and not to the image of the target that is used by other x and y feedback methods. This technique may also allow simple and accurate image distortion correction without having to calibrate the camera using a complex target and processes.

In practice it is often useful to have the axis of the camera housing aligned with the image coordinate system. For example, if the housing is a rectangle, if the back of the housing is parallel to the target plane and if the camera is located on a line perpendicular to the target plane and passing through the fiducial point, then the fiducial point should appear at the center of the image. However, as described with respect to some of the embodiments above, the lens may have been mounted in the camera such that the center of radial distortion coincides with the image center. If the lens is manufactured to a very high tolerance and the image sensor is mounted very accurately in the housing then the two criteria will coincide quite well. However, such manufacturing tolerances may tend to make the units very expensive.

One option would be to choose one or the other criteria. An alternative (and in some cases preferable) option would be to have the camera housing mounted to the lens such that the center of radial distortion is at the center of the image, then releasing the lens from its holder and rotating the assembled unit so that the fiducial point coincides with the center of the image. The unit may then be glued into an outer housing that is aligned with the target (i.e. an outer housing having a back that is parallel to the target plane).

The outer housing need not be in the form of a rectangular enclosure. It may, for example, include only a back, or it may include only one or more sides, or it may include a combination of a back and one or more sides. The outer housing need not be rectangular in shape but may instead assume any shape that enables the camera to be oriented to the target. Optionally, an additional axis of rotation could be added around the z axis and a second fiducial point could be added so that a roll between the image and the outer housing could be eliminated.

Although the examples described herein have been described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
   positioning a lens and an image sensor along multiple axes using a target located at a first distance from the lens to establish a first relative spacing between the lens and the image sensor, and
   modifying the first relative spacing between the lens and the image sensor by a predetermined amount for an object located a second distance from the lens,
      wherein the second distance is larger than the first distance, and
      wherein the predetermined amount is based on the first distance.

2. The method of claim 1 wherein positioning the lens and the image sensor along multiple axes comprises at least one of adjusting relative orientation between the lens and the image sensor and adjusting relative distance between the lens and the image sensor.

3. The method of claim 1 wherein positioning the lens and the image sensor along multiple axes comprises adjusting a relative position between the lens and the image sensor in at least one of three degrees of translation and in at least two degrees of rotation.

4. The method of claim 1 wherein the image sensor comprises pixel rows and pixel columns, wherein x represents an axis parallel to the pixel rows, wherein y represents an axis parallel to the pixel columns, wherein z represents an axis perpendicular to the image sensor, wherein θx represents rotation about the x axis, wherein θy represents rotation about the y axis and wherein positioning the lens and the image sensor along multiple axes comprises at least one of adjusting lens orientation along the θx and θy axes and adjusting distance between the lens and the image sensor along the z axis.

5. The method of claim 1 comprising detecting a center of radial distortion associated with the lens and positioning the lens and the image sensor so that the center of radial distortion coincides with a specified point associated with the image sensor.

6. The method of claim 5 wherein the image sensor has a center and wherein the specified point coincides with the center of the image sensor.

7. The method of claim 1 comprising fixing a relative position of the lens and the image sensor after modifying the first relative spacing between the lens and the image sensor by the predetermined amount.

8. An advanced driver assistance system, comprising:
   a lens,
   an image sensor, the lens and the image sensor being positioned relative to each other, the relative positioning being established by:
      positioning the lens and the image sensor along multiple axes using a target located at a first distance from the lens to establish a first relative spacing between the lens and the image sensor, and
      modifying the first relative spacing between the lens and the image sensor by a predetermined amount for an object located a second distance from the lens,
         wherein the second distance is larger than the first distance, and
         wherein the predetermined amount is based on the first distance.

9. The system of claim 8 wherein positioning the lens and the image sensor along multiple axes comprises at least one of adjusting relative orientation between the lens and the image sensor and adjusting relative distance between the lens and the image sensor.

10. The system of claim 8 wherein positioning the lens and the image sensor along multiple axes comprises adjusting the first a relative position between the lens and the image sensor in at least one of three degrees of translation and in at least two degrees of rotation.

11. The system of claim 8 wherein the image sensor comprises pixel rows and pixel columns, wherein x represents an axis parallel to the pixel rows, wherein y represents an axis parallel to the pixel columns, wherein z represents an axis perpendicular to the image sensor, wherein θx represents rotation about the x axis, wherein θy represents rotation about the y axis and wherein positioning the lens and the image sensor along multiple axes comprises at least one of adjusting lens orientation along the θx and θy axes and adjusting distance between the lens and the image sensor along the z axis.

12. The system of claim 8 comprising detecting a center of radial distortion associated with the lens and positioning the lens and the image sensor so that the center of radial distortion coincides with a specified point associated with the image sensor.

13. The system of claim 12 wherein the image sensor has a center and wherein the specified point coincides with the center of the image sensor.

14. The system of claim 8 wherein the relative position of the lens and the image sensor is fixed after modifying the first relative spacing between the lens and the image sensor by the predetermined amount.

15. The method of claim 1 wherein the target comprises a pattern that inverts radial distortion associated with the lens so that curved lines on the pattern appear less curved at the image sensor.

16. The system of claim 8 wherein the target comprises a pattern that inverts radial distortion associated with the lens so that curved lines on the pattern appear less curved at the image sensor.

* * * * *

UNITED STATES PATENT AND TRADEMARK OFFICE
CERTIFICATE OF CORRECTION

| | |
|---|---|
| PATENT NO. | : 10,196,005 B2 |
| APPLICATION NO. | : 15/001880 |
| DATED | : February 5, 2019 |
| INVENTOR(S) | : Eytan et al. |

It is certified that error appears in the above-identified patent and that said Letters Patent is hereby corrected as shown below:

In the Claims

In Column 6, Line 29, in Claim 10, before "a", delete "the first"

Signed and Sealed this
Twenty-eighth Day of April, 2020

Andrei Iancu
*Director of the United States Patent and Trademark Office*